United States Patent
Hirata et al.

(10) Patent No.: US 8,053,531 B2
(45) Date of Patent: Nov. 8, 2011

(54) HYDROGENATED CRYSTALLINE NORBORNENE RING-OPENING POLYMER AND MOLDED ARTICLE

(75) Inventors: Takeshi Hirata, Tokyo (JP); Takashi Houkawa, Tokyo (JP); Hiroaki Matsuda, Tokyo (JP); Yosuke Naka, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 12/920,239

(22) PCT Filed: Feb. 27, 2009

(86) PCT No.: PCT/JP2009/053695
§ 371 (c)(1),
(2), (4) Date: Oct. 6, 2010

(87) PCT Pub. No.: WO2009/107784
PCT Pub. Date: Sep. 3, 2009

(65) Prior Publication Data
US 2011/0021731 A1  Jan. 27, 2011

(30) Foreign Application Priority Data

Feb. 29, 2008 (JP) .................. 2008-050118

(51) Int. Cl.
C08F 8/04 (2006.01)
C08G 61/08 (2006.01)
C08F 4/69 (2006.01)

(52) U.S. Cl. ............ 525/332.1; 525/338; 525/940; 526/281; 526/282

(58) Field of Classification Search .......... 525/332.1, 525/338, 940; 526/281, 282
See application file for complete search history.

(56) References Cited

U.S. PATENT DOCUMENTS

| | | | |
|---|---|---|---|
| 3,330,815 A | | 7/1967 | McKeon et al. |
| 5,204,427 A | * | 4/1993 | Torii et al. ............ 526/282 |
| 6,653,424 B1 | | 11/2003 | Sakamoto et al. |
| 2006/0258828 A1 | | 11/2006 | Sugawara et al. |
| 2007/0185290 A1 | * | 8/2007 | Hayano et al. ........... 526/172 |
| 2010/0076396 A1 | | 3/2010 | Takahashi et al. |

FOREIGN PATENT DOCUMENTS

| | | |
|---|---|---|
| EP | 0559146 A1 | 9/1993 |
| EP | 1203656 A1 | 5/2002 |
| JP | 60-026024 A | 2/1985 |
| JP | 09-263627 A | 10/1997 |
| JP | 2002-020464 A | 1/2002 |
| JP | 2002-194067 A | 7/2002 |
| JP | 2002-249553 A | 9/2002 |
| JP | 2005-272642 A | 10/2005 |
| JP | 2006-052333 A | 2/2006 |
| JP | 2007-070384 A | 3/2007 |
| JP | 2007-246921 A | 9/2007 |
| JP | 2007-262170 A | 10/2007 |
| JP | 2008-087343 A | 4/2008 |
| WO | 01/14446 A1 | 3/2001 |
| WO | 2005/016991 A1 | 2/2005 |
| WO | 2008/026733 A1 | 3/2008 |

OTHER PUBLICATIONS

International Search Report of PCT/JP2009/053695, date of mailing Jun. 9, 2009.
Cataldo, Franco; "FTIR Spectroscopic Characterization of Hydrogenated Polyoctenamer and Polynorbornene and DSC Study of their Thermal Properties"; Polymer International, vol. 34, 1994, pp. 49-57.
Lee, Li-Bong W. et al.; "Equilibrium Control of Crystal Thickness and Melting Point through Block Copolymerization"; Macromolecules, vol. 37, 2004, pp. 7278-7284.
European Search Report dated Mar. 9, 2011, issued in corresponding European Patent Application No. 09715234.2.

* cited by examiner

*Primary Examiner* — Fred M Teskin
(74) *Attorney, Agent, or Firm* — Westerman, Hattori, Daniels & Adrian, LLP

(57) ABSTRACT

A hydrogenated crystalline norbornene ring-opening polymer is obtained by hydrogenating 80% or more of carbon-carbon double bonds of a ring-opening polymer that is obtained by ring-opening polymerization of norbornene monomers including 90 to 100 wt % of 2-norbornene and 0 to 10 wt % of a 2-norbornene derivative having a substituent which does not include an aliphatic carbon-carbon double bond in the presence of a branching agent, the hydrogenated crystalline norbornene ring-opening polymer having a melting point of 110 to 145° C. and a branching index of 0.3 to 0.98, and a molded article is obtained by molding the hydrogenated crystalline norbornene ring-opening polymer. The hydrogenated crystalline norbornene ring-opening polymer has excellent industrial productivity, and the molded article has excellent productivity and moisture resistance.

10 Claims, No Drawings

HYDROGENATED CRYSTALLINE NORBORNENE RING-OPENING POLYMER AND MOLDED ARTICLE

TECHNICAL FIELD

The present invention relates to a hydrogenated crystalline norbornene ring-opening polymer having excellent moldability and moisture resistance (moisture-proof properties), and a molded article obtained by molding the hydrogenated crystalline norbornene ring-opening polymer.

BACKGROUND ART

A hydrogenated norbornene ring-opening polymer has excellent transparency and a low birefringence, and application thereof as a resin material for an optical lens or an optical sheet has been proposed (Patent Documents 1 and 2). Since the hydrogenated norbornene ring-opening polymer exhibits excellent fluidity in a molten state and has excellent eluting properties and chemical resistance, application thereof as a resin material for other applications such as a packing film or a medical container has also been proposed (Patent Documents 3 and 4).

However, since most of the hydrogenated norbornene ring-opening polymers disclosed in these documents are amorphous, their water vapor barrier properties, oil resistance, and the like are insufficient depending on the application. Therefore, a further improvement in properties of hydrogenated norbornene ring-opening polymers has been desired.

Patent Document 5 discloses a method that obtains a hydrogenated amorphous norbornene ring-opening polymer by ring-opening polymerization of a norbornene monomer having an alkenyl group with a carbon-carbon double bond at the chain end and a norbornene monomer which does not have an alkenyl group with a carbon-carbon double bond at the chain end, and hydrogenating the resulting polymer. Patent Document 5 describes that the resulting hydrogenated amorphous norbornene ring-opening polymer has excellent moldability and is suitable for forming an optical molded article by injection molding.

However, the amorphous polymer disclosed in Patent Document 5 has poor moisture resistance.

As a hydrogenated norbornene ring-opening polymer having crystallinity (i.e., having a melting point), a hydrogenated crystalline norbornene ring-opening polymer containing a repeating unit of a norbornene monomers having three or more rings has been known (Patent Documents 6 to 8). A resin film or sheet obtained using the hydrogenated norbornene ring-opening polymer disclosed in these documents has excellent transparency, heat resistance, chemical resistance, and mechanical strength.

However, a film obtained by molding the above hydrogenated crystalline norbornene ring-opening polymer does not fully satisfy the requirements for moisture permeability. Moreover, the above hydrogenated crystalline norbornene ring-opening polymer has poor solubility in a solvent, and may precipitate from a reaction solution after hydrogenating the ring-opening polymer. This may make it difficult to sufficiently purify the polymer by removing residual catalysts and the like.

Non-patent Documents 1 and 2 disclose a hydrogenated norbornene ring-opening copolymer possessing crystallinity. However, these documents do not specifically describe the properties of the polymer. Among the specifically disclosed polymers, the polymers having a high molecular weight and a narrow molecular weight distribution exhibit difficulty in producing a film with a smooth surface, since these polymers tend to undergo melt-fracture due to high shearing viscosity at a high shear rate during film formation. On the other hand, a film formed of a polymer having a low molecular weight has small tensile elongation at break (i.e., insufficient mechanical characteristics). Moreover, since the hydrogenation degree of the hydrogenated ring-opening polymer disclosed in these documents is not necessarily sufficient, a molded article obtained by molding the polymer may be easily discolored.

Patent Document 1: JP-A-60-26024
Patent Document 2: JP-A-9-263627
Patent Document 3: JP-A-2000-313090 (WO 2000/066357)
Patent Document 4: JP-A-2003-183361 (EP 559146)
Patent Document 5: JP-A-2007-262170
Patent Document 6: JP-A-2002-020464
Patent Document 7: JP-A-2002-194067
Patent Document 8: JP-A-2006-052333
Non-patent Document 1: Polymer International, Vol. 34, pp. 49-57 (1994)
Non-patent Document 2: Macromolecules, Vol. 37, pp. 7278-7284 (2000)

DISCLOSURE OF THE INVENTION

Problems to be Solved by the Invention

The applicant of the present application previously proposed a hydrogenated norbornene ring-opening copolymer obtained by hydrogenating 80% or more of carbon-carbon double bonds of a ring-opening copolymer which is obtained by ring-opening copolymerization of 2-norbornene and a substituent-containing norbornene monomer, the ratio of a repeating unit (A) derived from 2-norbornene with respect to all of the repeating units being 90 to 99 wt %, the ratio of a repeating unit (B) derived from the substituent-containing norbornene monomer with respect to all of the repeating units being 1 to 10 wt %, and the hydrogenated norbornene ring-opening polymer having a melting point of 110 to 145° C. (JP-A-2006-237000, PCT/JP2007/067043, etc.). This hydrogenated crystalline norbornene ring-opening polymer has excellent properties (e.g., water vapor barrier properties, heat resistance, oil resistance, mechanical characteristics, transparency, and processability) required for a molding material.

However, this hydrogenated crystalline norbornene ring-opening polymer is a linear polymer having a low melt tension, and easily produces a large neck-in amount, which is a phenomenon wherein the extruded film has a width smaller than the effective die width when molding the polymer into a film using a T-die. The neck-in amount can be reduced while increasing the mechanical strength of the film by increasing the molecular weight of the polymer. However, since a polymer having a high molecular weight has a low flow rate at a high shear rate, it may be difficult to form a film. Moreover, crystallization of the film may not sufficiently proceed due to a decrease in crystallization rate, so that the moisture resistance may decrease.

The present invention was conceived in view of this situation. An object of the present invention is to provide a hydrogenated crystalline norbornene ring-opening polymer having excellent moldability and moisture resistance, and a molded article obtained by molding the polymer.

Means for Solving the Problems

The inventors conducted extensive studies in order to obtain a hydrogenated crystalline norbornene ring-opening polymer having excellent moldability and moisture resistance. As a result, the inventors found that providing a hydrogenated crystalline norbornene ring-opening polymer with a branched structure makes it possible to easily form a film with excellent water vapor barrier properties (moisture resistance) without increasing the molecular weight of the polymer. This finding has led to the completion of the present invention.

According to a first aspect of the present invention, there is provided a hydrogenated crystalline norbornene ring-opening polymer defined in (1) to (4).

(1) A hydrogenated crystalline norbornene ring-opening polymer obtained by hydrogenating 80% or more of carbon-carbon double bonds of a ring-opening polymer that is obtained by ring-opening polymerization of norbornene monomers including 90 to 100 wt % of 2-norbornene and 0 to 10 wt % of a 2-norbornene derivative having a substituent which does not include an aliphatic carbon-carbon double bond, the hydrogenated crystalline norbornene ring-opening polymer having a melting point of 110 to 145° C. and a branching index of 0.3 to 0.98.

(2) The hydrogenated crystalline norbornene ring-opening polymer according to (1), the hydrogenated crystalline norbornene ring-opening polymer having a weight average molecular weight measured by gel permeation chromatography of 50,000 to 200,000, and a ratio of the weight average molecular weight to the number average molecular weight of 1.5 to 10.0.

(3) The hydrogenated crystalline norbornene ring-opening polymer according to (1) or (2), wherein the ring-opening polymerization is carried out in the presence of a branching agent.

(4) The hydrogenated crystalline norbornene ring-opening polymer according to any one of (1) to (3), the hydrogenated crystalline norbornene ring-opening polymer having a melt flow rate of 15 g/10 min or less at a temperature of 230° C and a load of 21.18 N.

According to a second aspect of the present invention, there is provided a molded article defined in (5).

(5) A molded article obtained by molding the polymer according to any one of (1) to (4).

Effects of the Invention

According to the present invention, a hydrogenated crystalline norbornene ring-opening polymer having excellent moldability is provided. A molded article (e.g., film etc.) having excellent moisture resistance can be easily molded using the hydrogenated crystalline norbornene ring-opening polymer according to the present invention.

The molded article according to the present invention possesses excellent moisture resistance and processability as demanded in recent years in the fields of information processing, food industries, medical supplies, civil engineering works, and the like.

BEST MODE FOR CARRYING OUT THE INVENTION

The present invention is described in detail below in order of 1) a hydrogenated crystalline norbornene ring-opening polymer and 2) a melded article.

1) Hydrogenated Crystalline Norbornene Ring-Opening Polymer

A hydrogenated crystalline norbornene ring-opening polymer according to the present invention is obtained by hydrogenating 80% or more of carbon-carbon double bonds of a ring-opening polymer that is obtained by ring-opening polymerization of norbornene monomers including 90 to 100 wt % of 2-norbornene and 0 to 10 wt % of a 2-norbornene derivative having a substituent which does not include an aliphatic carbon-carbon double bond, the hydrogenated crystalline norbornene ring-opening polymer having a melting point of 110 to 145° C and a branching index of 0.3 to 0.98.

(Norbornene Monomer)

The norbornene monomers used in the present invention are monomers having a norbornene structure which does not produce a branched structure by a metathesis reaction with an olefin. The norbornene monomers include 2-norbornene and a 2-norbornene derivative having a substituent which does not include an aliphatic carbon-carbon double bond.

The norbornene monomers include 90 to 100 wt % of 2-norbornene (bicyclo[2.2.1]hept-2-ene) and 0 to 10 wt % of a 2-norbornene derivative having a substituent which does not include an aliphatic carbon-carbon double bond. The content of 2-norbornene is preferably 95 to 99 wt %, and more preferably 97 to 99 wt %, and the content of a 2-norbornene derivative having a substituent excluding a substituent reactable by an olefin metathesis reaction is preferably 1 to 5 wt %, and more preferably 1 to 3 wt %.

2-Norbornene is a known compound, and may be obtained by reacting cyclopentadiene and ethylene, for example.

A 2-norbornene derivative having a substituent which does not include an aliphatic carbon-carbon double bond is classified into a norbornene monomer having a substituent which does not include an aliphatic carbon-carbon double bond and not having a ring condensed with the 2-norbornene ring and a polycyclic (tricyclic or higher) norbornene monomer having a substituent which does not include an aliphatic carbon-carbon double bond and having a ring structure condensed with the norbornene ring in the molecule.

Examples of a norbornene monomer having a substituent which does not include an aliphatic carbon-carbon double bond and not having a ring condensed with the norbornene ring include norbornenes having an alkyl group such as 5-methyl-bicyclo[2.2.1]hept-2-ene (5-methyl-2-norbornene), 5-ethyl-bicyclo[2.2.1]hept-2-ene, 5-butyl-bicyclo[2.2.1]hept-2-ene, 5-hexyl-bicyclo[2.2.1]hept-2-ene, 5-decyl-bicyclo[2.2.1]hept-2-ene, 5-cyclohexyl-bicyclo[2.2.1]hept-2-ene, and 5-cyclopentyl-bicyclo[2.2.1]hept-2-ene;

norbornenes having an aromatic ring such as 5-phenyl-bicyclo[2.2.1]hept-2-ene (5-phenyl-2-norbornene);

norbornenes having an oxygen-containing polar group such as 5-methoxycarbonyl-bicyclo[2.2.1]hept-2-ene (5-methoxycarbonyl-2-norbornene), 5-ethoxycarbonyl-bicyclo[2.2.1]hept-2-ene, 5-methyl-5-methoxycarbonyl-bicyclo[2.2.1]hept-2-ene, 5-ethoxycarbonyl-5-methyl-bicyclo[2.2.1]hept-2-ene, 5-hydroxy-bicyclo[2.2.1]hept-2-ene 2-methylpropionate, 5-hydroxy-bicyclo[2.2.1]hept-2-ene 2-methyloctanoate, 5-hydroxymethyl-bicyclo[2.2.1]hept-2-ene, 5,6-di(hydroxymethyl)-bicyclo[2.2.1]hept-2-ene, 5,5-di(hydroxymethyl)-bicyclo[2.2.1]hept-2-ene, 5-hydroxyisopropyl-bicyclo[2.2.1]hept-2-ene, 5,6-dicarboxy-bicyclo[2.2.1]hept-2-ene, and 6-carboxy-5-methoxycarbonyl-bicyclo[2.2.1]hept-2-ene;

norbornenes having a nitrogen atom-containing polar group such as 5-cyano-bicyclo[2.2.1]hept-2-ene and 6-carboxy-5-cyano-bicyclo[2.2.1]hept-2-ene; and the like.

A polycyclic (tricyclic or higher) norbornene monomer having a substituent which does not include an aliphatic carbon-carbon double bond is a norbornene monomer having a norbornene ring and one or more rings condensed with the norbornene ring in the molecule.

Specific examples include dicyclopentadienes such as tricyclo[4.3.0.1$^{2,5}$]deca-3,7-diene (common name: dicyclopentadiene), methyl dicyclopentadiene, and dimethyl dicyclopentadiene;

norbornene derivatives having an aromatic ring such as tetracyclo[9.2.1.0$^{2,10}$.0$^{3,8}$]tetradeca-3,5,7,12-tetraene (also referred to as 1,4-methano-1,4,4a,9a-tetrahydro-9H-fluorene) and tetracyclo[10.2.1.0$^{2,11}$.0.0$^{4,9}$]pentadeca-4,6,8,13-tetraene (also referred to as 1,4-methano-1,4,4a,9,9a,10-hexahydroanthracene);

tetracyclododecenes unsubstituted or substituted by an alkyl group such as tetracyclododecene, 8-methyltetracyclododecene, 8-ethyltetracyclododecene, 8-cyclohexyltetracyclododecene, and 8-cyclopentyltetracyclododecene;

tetracyclododecenes having an aromatic ring such as 8-phenyltetracyclododecene;

tetracyclododecenes having an oxygen atom-containing substituent such as 8-methoxycarbonyltetracyclododecene, 8-methyl-8-methoxycarbonyl tetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride;

tetracyclododecenes having a nitrogen atom-containing substituent such as 8-cyanotetracyclododecene and tetracyclododecene-8,9-dicarboxylic acid imide;

tetracyclododecenes having a halogen-containing substituent such as 8-chlorotetracyclododecene;

tetracyclododecenes having a silicon atom-containing substituent such as 8-trimethoxysilyhetracyclododecene;

hexacycloheptadecenes not having a substituent or substituted by an alkyl group such as hexacycloheptadecene, 12-methylhexacycloheptadecene, 12-ethylhexacycloheptadecene, 12-cyclohexylhexacycloheptadecene, and 12-cyclopentylhexacycloheptadecene;

hexacycloheptadecenes having an aromatic ring such as 12-phenylhexacycloheptadecene;

hexacycloheptadecenes having an oxygen-containing substituent such as 12-methoxycurbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene 12,13-dicarboxylic acid, and hexacycloheptadecene 12,13-dicarboxylic acid anhydride;

hexacycloheptadecenes having a nitrogen-containing substituent such as 12-cyanohexacycloheptadecene and hexacycloheptadecene 12,13-dicarboxylic acid imide;

hexacycloheptadecenes having a halogen-containing substituent such as 12-chlorohexacycloheptadecene;

hexacycloheptadecenes having a silicon-containing substituent such as 12-trimethoxysilylhexacycloheptadecene; and the like.

These norbornene monomers having a substituent which does not include an aliphatic carbon-carbon double bond may be used either individually or in combination.

The hydrogenated crystalline norbornene ring-opening polymer according to the present invention has a branched structure. The branched structure may be produced by ring-opening polymerization of a norbornene monomer in the presence of a branching agent.

The branching agent contributes to an olefin metathesis reaction by which bonds in two types of olefin are recombined to produce a new olefin in the presence of a carbene complex catalyst. The branching agent has an aliphatic carbon-carbon double bond and a cycloalkane or cycloalkene structure. Specifically, the branching agent is (1) a compound having two or more cycloalkene structures in the molecule, (2) a compound having a cycloalkene structure and one or more substituents including an aliphatic carbon-carbon double bond in the molecule, or (3) a cycloalkane compound having three or more substituents including an aliphatic carbon-carbon double bond in the molecule.

Examples of a substituent including an aliphatic carbon-carbon double bond include an alkenyl group having 2 to 20 carbon atoms, preferably 2 to 10 carbon atoms, and more preferably 2 to 4 carbon atoms. Specific examples include a vinyl group, an allyl group, a 3-butenyl group, a 4-pentenyl group, a 2-methyl-3-butenyl group, a 5-heptyl group, and the like. Among these, a vinyl group and an allyl group are preferable in order to obtain a hydrogenated norbornene ring-opening polymer with excellent fluidity.

These alkenyl groups may bond to a mother nucleus through an optional group, or may form a cyclic structure by bonding to a mother nucleus through an optional group. Examples of such an optional group include an alkylene group, —O—, —S—, —O—CO—, —O—CH$_2$—O—CO—, a phenylene group, and the like. In order to obtain a hydrogenated norbornene ring-opening polymer with excellent fluidity, an optional group has preferably 10 or less carbon atoms, and more preferably 5 or less carbon atoms, and does not have a divalent group other than an alkylene group.

Examples of the branching agent include a monomer having a norbornene structure having a substituent reactive via an olefin metathesis reaction such as 5-vinyl-oxycarbonyl-bicyclo[2.2.1]hept-2-ene, 8-vinyl-tetracyclo[4.4.0.1$^{2,5}$.1$^{7,10}$]dodec-3-ene, 8-allyl-tetracyclo[4.4.0.1$^{2,5}$.1$^{7,10}$]dodec-3-ene, and 8-vinyl-oxycarbonyl-tetracyclo[4.4.0.1$^{2,5}$.1$^{7,10}$]dodec-3-ene;

a monomer which has two norbornene structures in the molecule such as exo-trans-exo-pentacyclo[8.2.1.1$^{4,7}$.0$^{2,9}$.0$^{3,8}$]tetra-deca-5,11-diene (hereinafter referred to from time to time as "NB-dimer"), 4,4a,4b,5,8,8a,9,9a-octahydro-1,4:5,8-bismethano-1H-fluorene, 1α,4α:5α,8α-dimethano-1,4,4a,5,8,8a,9,9a,10,10a-decahydroanthracene, 5,5'-bi(norborn-2-ene), tetracyclo[6.2.1.1$^{3,6}$.0$^{2,7}$]dodeca-4,9-diene, and 1,4,4a,5,8,8a,9,9a,10,10a-decahydro-1,4:5,8:9,10-trimethanoanthracene;

a monomer having three or more terminal carbon-carbon double bonds in the molecule such as 1,2,4-trivinylcyclohexane, 4-(2-propenyl)-1,6-heptadiene, 3-vinyl-1,4-pentadiene, 3-vinyl-1,5-hexadiene, 1,3,5-trivinylbenzene, 1,2,4-trivinylbenzene, and 1,2,4,5-tetravinylbenzene; and the like.

For example, a three-branch polymer (polymer having three branches) can be produced by ring-opening polymerization of 2-norbornene (2-NB), which is a norbornene monomer, in the presence of 5-vinylbicyclo[2.2.1]hept-2-ene (VNB), which is a compound having a cycloalkene structure and one or more substituents including an aliphatic carbon-carbon double bond in the molecule, as shown by the following formula.

[Chemical Formula 1]

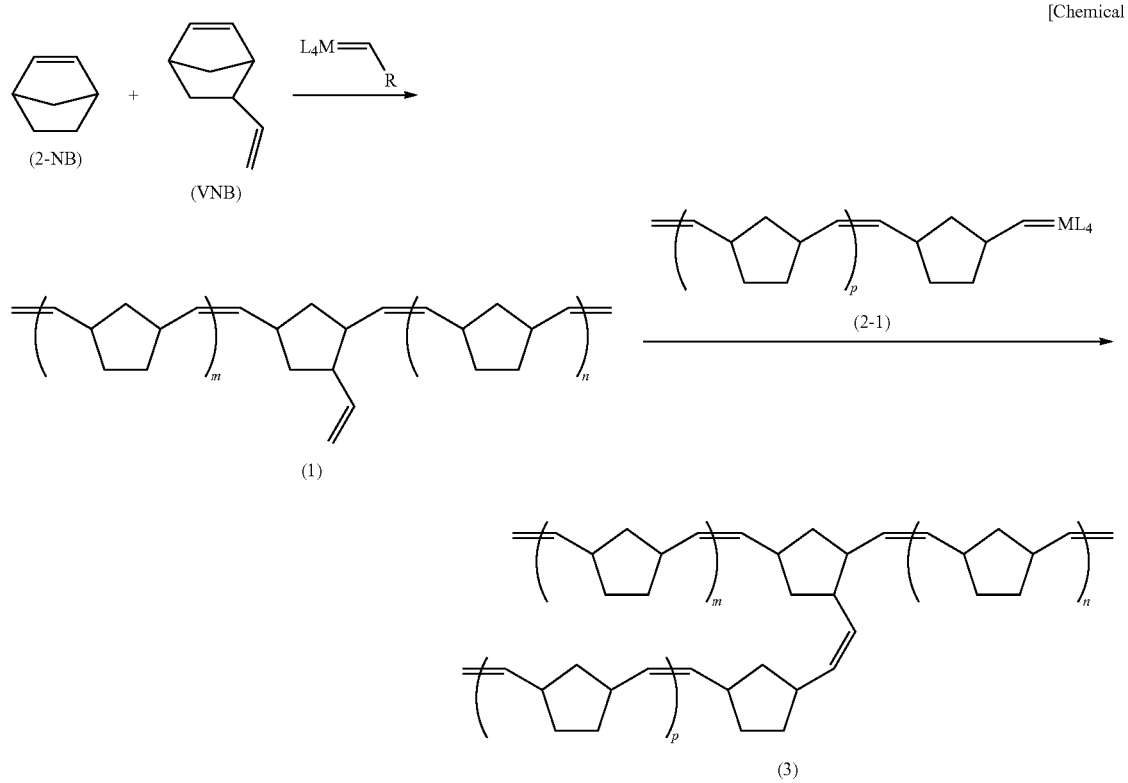

In the above formula, M represents a transition metal atom such as tungsten, L represents a ligand such as a halogen atom, R represents an alkyl group or the like, and m, n, and p are respectively positive integers.

Specifically, a three-branch polymer (3) is obtained by a ring-opening metathesis reaction of 2-norbornene (2-NB) and 5-vinylnorbornene (VNB) to produce a polymer chain (1), followed by a metathesis reaction of the polymer chain (1) and another polymer chain (2-1).

If 2-norbornene (2-NB) is polymerized by ring-opening polymerization in the presence of an NB-dimer, which is a compound having two or more cycloalkene structures in the molecule, a four-branch polymer is produced as shown by the following formula.

[Chemical Formula 2]

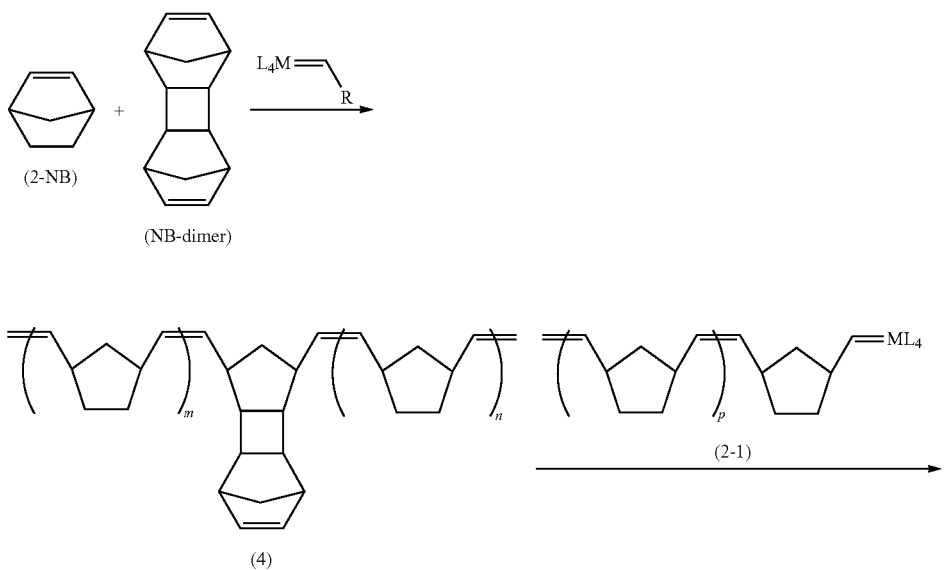

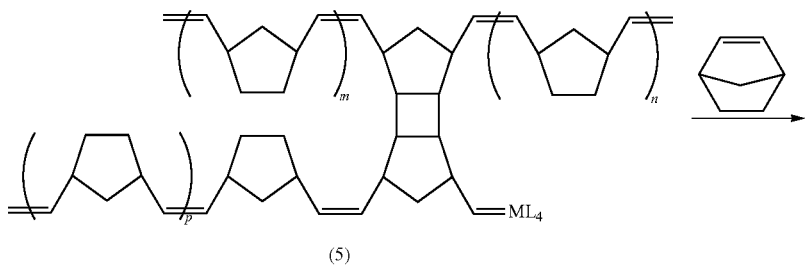

(5)

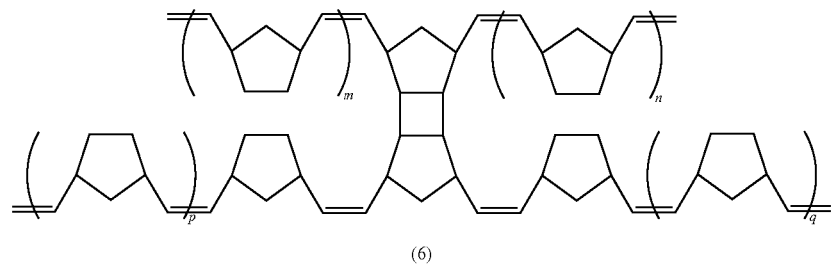

(6)

In the above formula, M, L, R, m, n, and p have the same meanings as defined above, and q is a positive integer.

Specifically, a polymer chain (5) is obtained by a ring-opening metathesis reaction of 2-norbornene (2-NB) and NB-dimer to produce a polymer chain (4), and a metathesis reaction of the polymer chain (4) and another polymer chain (2-1). Then, a four-chain polymer (6) is obtained by a metathesis reaction of the polymer chain (5) and 2-norbornene (2-NB).

Another three-branch polymer can be produced by ring-opening polymerization of 2-norbornene (2-NB) in the presence of 1,2,4-trivinylcyclohexane (TVC), which is a compound having three or more substituents including an aliphatic carbon-carbon double bond in the molecule as shown in the following formula.

[Chemical Formula 3]

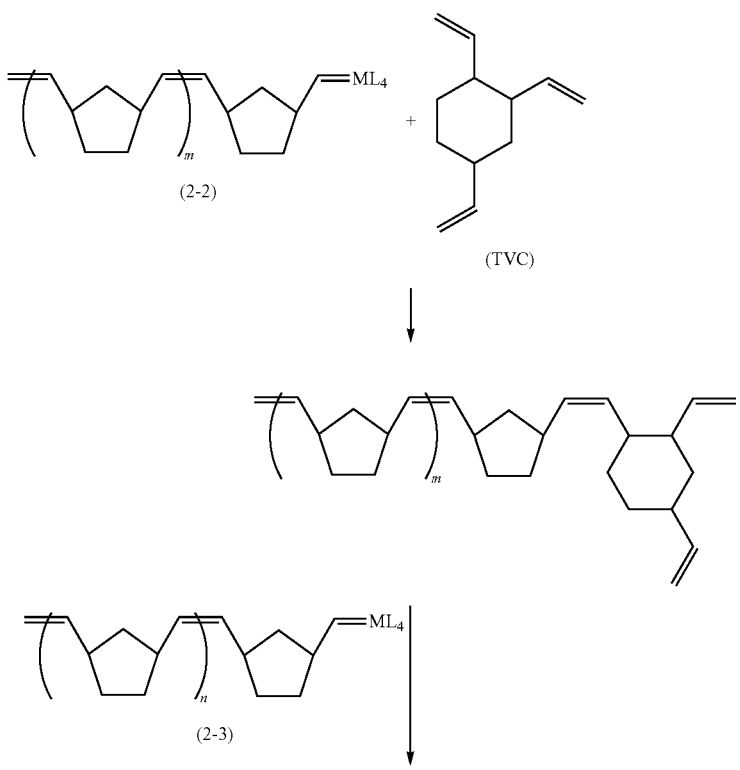

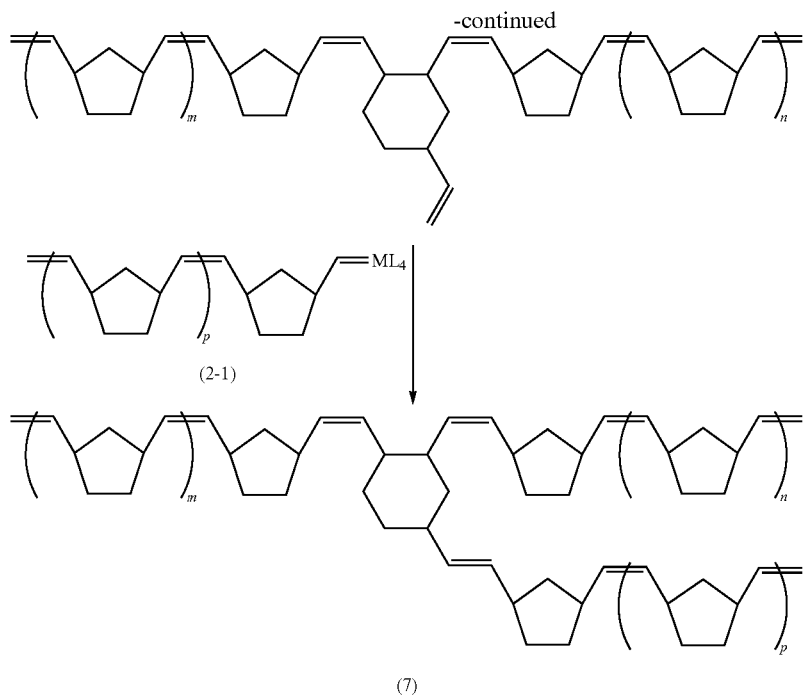

(7)

In the above formula, M, L, m, n, and p have the same meaning as defined above. Specifically, a polymer chain (2) obtained from 2-norbornene (2-NB) and three vinyl groups of 1,2,4-trivinylcyclohexane (TVC) respectively react by a metathesis reaction to produce a three-branch polymer (7).

When a branching agent has a mother nucleus polymerizable by ring-opening metathesis polymerization, the monomer forming such a mother nucleus contributes to the ring-opening polymerization together with a norbornene monomer which does not have a substituent reactive in an olefin metathesis reaction.

As mentioned later, the hydrogenated crystalline norbornene ring-opening polymer according to the present invention has a branching index of 0.3 to 0.98. A hydrogenated crystalline norbornene ring-opening polymer with a desired branching index can be obtained by appropriately adjusting the amount of a branching agent used in the ring-opening polymerization.

The amount of the branching agent used is normally 0.01 to 5 mol %, preferably 0.05 to 5 mol %, and more preferably 0.1 to 5 mol % per 100 mol % of the norbornene monomers.

(Metathesis Polymerization Catalyst)

Examples of the metathesis polymerization catalyst include a metathesis polymerization catalyst which essentially consists of (a) a transition metal compound catalyst component and (b) a metal compound co-catalyst component described in JP-B-41-20111, JP-A-46-14910, JP-B-57-17883, JP-B-57-61044, JP-A-54-86600, JP-A-58-127728, and JP-A-1-240517; a living ring-opening metathesis catalyst such as a Schrock polymerization catalyst (JP-A-7-179575, Schrock et al., J. Am. Chem. Soc., 1990, vol. 112, from page 3875, etc.), Grubbs polymerization catalyst (Fu et al., J. Am. Chem. Soc., 1993, Vol. 115, from page 9856, Nguyen et al., J. Am. Chem. Soc., 1992, vol. 114, from page 3974; Grubbs et al. WO 98/21214, etc.); and the like.

In order to control the molecular weight distribution of the resulting polymer in a suitable range, a metathesis polymerization catalyst comprising (a) a transition metal compound catalyst component and (b) a metal compound co-catalyst component is preferable among these catalysts.

The transition metal compound catalyst component (a) is a transition metal compound of Groups 3 to 11 of the Periodic Table. Examples of the specific transition metal compound include a halide, an oxyhalide, an alkoxyhalide, an alkoxide, a carbonate, an (oxy)acetylacetonate, a carbonyl complex, an acetonitrile complex, and a hydride complex of these transition metals, and derivatives of these compounds, as well as a complex compound derived from the reaction of these transition metal compounds or derivatives thereof and a complexing agent such as $P(C_6H_5)_3$.

Specific examples include $TiCl_4$, $TiBr_4$, $VOCl_3$, $WBr_3$, $WCl_6$, $WOCl_4$, $MoCl_5$, $MoOCl_4$, $WO_3$, $H_2WO_4$, and the like. Among these, compounds of W, Mo, Ti, or V, particularly a halide, an oxyhalide, or an alkoxyhalide are preferable from the viewpoint of polymerization activity.

The metal compound co-catalyst component (b) is a compound of a metal belonging to Groups 1 to 2 and Groups 12 to 14 of the Periodic Table having at least one metal element-carbon atom bond or at least one metal element-hydrogen bond. For example, an organic compound of Al, Sn, Li, Na, Mg, Zn, Cd, and B can be given.

Specific examples include organoaluminum compounds such as trimethylaluminum, triisobutylaluminum, diethylaluminum monochloride, methylaluminum sesquichloride, and ethylaluminum dichloride; organotin compounds such as tetramethyltin, diethyldimethyltin, tetrabutyltin, and tetraphenyltin; organolithium compounds such as n-butyllithium; organosodium compounds such as n-pentylsodium; organomagnesium compounds such as methylmagnesium iodide; organozinc compounds such as diethylzinc; organocadmium compounds such as diethyl cadmium; organoboron compounds such as trimethylboron; and the like. Among these, compounds of elements belonging to Group 13 are preferable, with organoaluminum compounds being particularly preferable.

It is possible to increase the metathesis polymerization activity by adding a third component in addition to the component (a) and the component (b). Examples of the third component used include aliphatic tertiary amines, aromatic tertiary amines, molecular oxygen, alcohols, ethers, peroxides, carboxylic acids, acid anhydrides, acid chlorides, esters, ketones, nitrogen-containing compounds, halogen-containing compounds, and other Lewis acids.

The ratio of the component (a) to the component (b), in terms of molar ratio of metals, is normally in the range of 1:1 to 1:100, and preferably 1:2 to 1:10. The molar ratio of the component (a) to the third component is normally in the range of 1:0.005 to 1:50, and preferably 1:1 to 1:10.

The amount of the polymerization catalyst used, in terms of molar ratio of the transition metals in the polymerization catalyst to the total amount of monomers, is normally 1:100 to 1:2,000,000, preferably 1:1,000 to 1:20,000, and more preferably 1:5,000 to 1:8,000. If the amount of the catalyst is too large, catalyst removal after the polymerization reaction may become difficult, or the molecular weight distribution may become broad. If the amount of the catalyst is too small, sufficient polymerization activity may not be obtained.

(Molecular Weight-Adjusting Agent)

It is possible to add a molecular weight-adjusting agent to the ring-opening polymerization reaction system. The molecular weight of the ring-opening polymer can be adjusted by adding the molecular weight-adjusting agent.

A known molecular weight-adjusting agent may be used without particular limitation. Examples of the molecular weight-adjusting agent include α-olefins such as 1-butene, 1-pentene, 1-hexene, and 1-octene; styrenes such as styrene and vinyltoluene; ethers such as ethyl vinyl ether, isobutyl vinyl ether, and allyl glycidyl ether; halogen-containing vinyl compounds such as allylchloride; oxygen-containing vinyl compounds such as glycidyl methacrylate; nitrogen-containing vinyl compounds such as acrylamide; nonconjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; conjugated dienes such as 1,3-butadiene, 2-methyl-1,3-butadiene, 2,3-dimethyl-1,3-butadiene, 1,3-pentadiene, and 1,3-hexadiene; and the like. Among these, α-olefins are preferable due to their capability of easily adjusting the molecular weight.

The amount of the molecular weight-adjusting agent is not particularly limited insofar as a polymer with a desired molecular weight can be obtained. The amount of the molecular weight-adjusting agent, in terms of the molar ratio of the molecular weight-adjusting agent to the total amount of all monomers used, is normally 1:50 to 1:1,000,000, preferably 1:100 to 1:5,000, and more preferably 1:300 to 1:3,000.

(Ring-Opening Polymerization)

The ring-opening polymerization reaction may be initiated by mixing the norbornene monomers with the branching agent, the metathesis polymerization catalyst, and optionally the molecular weight-adjusting agent.

The ring-opening polymerization reaction is normally carried out in a solvent. There are no specific limitations to an organic solvent used insofar as the solvent can dissolve or disperse the polymer or the hydrogenated polymer under specified conditions and does not affect the polymerization reaction and the hydrogenation reaction. An industrially available common solvent is preferable.

Specific examples of the organic solvent include aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene cyclohexane, and cyclooctane; aromatic hydrocarbons such as benzene, toluene, and xylene; halogen-containing aliphatic hydrocarbons such as dichloromethane, chloroform, and 1,2-dichloroethane; halogen-containing aromatic hydrocarbons such as chlorobenzene and dichlorobenzene; nitrogen-containing hydrocarbons such as nitromethane, nitrobenzene, and acetonitrile; ethers such as diethyl ether and tetrahydrofuran; and the like. These organic solvents may be used either individually or in a combination of two or more. Among these, the aromatic hydrocarbons, aliphatic hydrocarbons, alicyclic hydrocarbons, and ethers widely used in the industrial field are preferable.

When polymerization is carried out in the organic solvent, the monomer (monomer mixture) concentration is preferably 1 to 50 wt %, more preferably 2 to 45 wt %, and particularly preferably 3 to 40 wt %. If the monomer concentration is less than 1 wt %, productivity may decrease; if more than 50 wt %, the solution viscosity after polymerization may become too high, so that the subsequent hydrogenation reaction may become difficult.

Although not particularly limited, the polymerization temperature is normally −20 to +100° C, and preferably 10 to 80° C. If the temperature of the polymerization reaction is too low, the reaction rate may be reduced. When the polymerization temperature is too high, there is a possibility that the molecular weight distribution may be broadened by side reactions.

Although not particularly limited, the polymerization reaction time is normally from one minute to 100 hours.

The pressure conditions during the polymerization are also not particularly limited. When the polymerization is carried out under pressure, the pressure applied is normally 1 MPa or less.

After completion of the reaction, the target ring-opening polymer of norbornene monomers can be isolated by a common post-treatment.

(Hydrogenation Reaction)

The resulting norbornene ring-opening polymer is supplied to the next hydrogenation reaction step. The hydrogenation reaction may also be continuously performed by adding a hydrogenation catalyst to the ring-opening polymerization reaction solution without isolating the norbornene ring-opening polymer as later described.

The hydrogenation reaction of the norbornene ring-opening polymer is a reaction of adding hydrogen to the carbon-carbon double bonds in the main chain and/or the side chain of the norbornene ring-opening polymer.

The hydrogenation reaction is carried out by adding a hydrogenation catalyst to a solution of the norbornene ring-opening polymer in an inert solvent while supplying hydrogen to the reaction system.

Any hydrogenation catalyst commonly used for hydrogenating olefin compounds may be used without specific limitation. The catalyst may be either a homogeneous catalyst or a heterogeneous catalyst. A heterogeneous catalyst is preferred when removal of metals from the resulting polymer or the like is considered.

Examples of the homogeneous catalyst include a catalyst system consisting of a combination of a transition metal compound and an alkali metal compound, for example, cobalt acetate and triethylaluminum, nickel acetylacetonate and triisobutylaluminum, titanocene dichloride and n-butyllithium, zirconocene dichloride and sec-butyllithium, and tetrabutoxy titanate and dimethyl magnesium; a noble metal complex catalyst such as dichlorobis(triphenylphosphine)palladium, chlorohydridecarbonyl tris(triphenylphosphine)ruthenium, chlorotris(triphenylphosphine)rhodium, and bis(tricyclohexylphosphine)benzylidyne ruthenium (IV) dichloride; and the like.

Examples of the heterogeneous catalyst include nickel, palladium, platinum, rhodium, and ruthenium, or solid catalysts with these metals supported on a carrier such as carbon, silica, diatomaceous earth, alumina, or titania, for example, nickel on silica, nickel on diatomaceous earth, nickel on alumina, palladium on carbon, palladium on silica, palladium on diatomaceous earth, and palladium on alumina.

The amount of the catalyst used is normally 0.05 to 10 parts by weight with respect to 100 parts by weight of the norbornene ring-opening polymer.

Examples of the inert organic solvent used for the hydrogenation reaction include the same organic solvents as those used for the previously-mentioned ring-opening polymerization such as aliphatic hydrocarbons, alicyclic hydrocarbons, aromatic hydrocarbons, halogenated aromatic hydrocarbons, nitrogen-containing hydrocarbons, and ethers.

The hydrogenation reaction temperature varies according to the hydrogenation catalyst used. The reaction temperature is normally from −20 to +300° C, and preferably from 0 to +250° C. If the hydrogenation temperature is too low, the reaction speed may be slow; if too high, side reactions may occur.

The hydrogenation pressure is normally from 0.01 to 20 MPa, preferably from 0.1 to 10 MPa, and more preferably from 1 to 5 MPa. If the hydrogen pressure is too low, the reaction speed is slow. Too high a pressure is undesirable because a high pressure reactor must be used.

After the hydrogenation reaction, the reaction solution is filtered to remove the hydrogenation catalyst, and volatile components such as a solvent are removed from the polymer solution after the filtration to obtain the target hydrogenated crystalline norbornene ring-opening polymer. After the hydrogenation reaction, additives such as an antioxidant (stabilizer), a nucleating agent, a foaming agent, a flame retardant, and other polymers such as a thermoplastic resin, and a soft polymer, as well as other additives commonly used in the resin industry field such as a dye, an antistatic agent, a UV absorber, a light stabilizer, a wax, and the like may be added, optionally followed by heating and filtration.

As a method for removing volatile components such as a solvent, a coagulation method, a direct drying method, or the like may be used.

In the coagulation method, a polymer solution is mixed with a poor solvent for the polymer to precipitate the polymer. Examples of a poor solvent used include polar solvents including alcohols such as ethyl alcohol, n-propyl alcohol, and isopropyl alcohol; ketones such as acetone and methyl ethyl ketone; and esters such as ethyl acetate and butyl acetate.

The component in the form of particles obtained by coagulation is dried by heating under vacuum, in nitrogen, or in air to obtain dry particles, or made into pellets by extruding from a melt extruder.

A direct drying technique is a method of removing solvents by heating the polymer solution under reduced pressure. This method may be carried out using a centrifugal thin-film continuous vaporization dryer, a surface scraping heat exchange-type continuous reactor dryer, a high viscosity reactor, or the like. The degree of vacuum and the temperature are not particularly limited and are suitably selected according to the apparatus used.

The hydrogenated crystalline norbornene ring-opening polymer according to the present invention can be obtained in this manner.

(Hydrogenated Crystalline Norbornene Ring-Opening Polymer)

The hydrogenation degree of the carbon-carbon double bonds in the hydrogenated crystalline norbornene ring-opening polymer according to the present invention is normally 80% or more, preferably 90% or more, more preferably 95% or more, still more preferably 99% or more, and particularly preferably 99.9% or more. If the hydrogenation degree is in the above range, coloration of the molded article by resin burning can be suppressed.

The hydrogenation degree of the hydrogenated crystalline norbornene ring-opening polymer can be determined by $^1$H-NMR spectrum measurement using deuterochloroform as a solvent The isomerization degree of the hydrogenated crystalline norbornene ring-opening polymer according to the present invention is normally 25% or less, preferably 20% or less, more preferably 15% or less, and still more preferably 10% or less. If the isomerization degree is too high, the polymer may have reduced heat resistance.

The isomerization degree may be calculated by "33.0 ppm peak integration value/(31.8 ppm peak integration value+ 33.0 ppm peak integration value)×100" (the peak integration values are determined by $^{13}$C-NMR using deuterochloroform as a solvent). In the $^{13}$C-NMR spectrum, the 31.8 ppm peak is a peak attributed to cis-isomers of 2-norbornene repeating units in the polymer and the 33.0 ppm peak is a peak attributed to trans-isomers of 2-norbornene repeating units in the polymer.

In order to produce a hydrogenated norbornene ring-opening polymer having an isomerization degree in the above range, the hydrogenation reaction temperature is preferably 100 to 230° C, more preferably 130 to 220° C, and particularly preferably 150 to 210° C, and the amount of the hydrogenation catalyst is preferably 0.2 to 5 parts by weight, and more preferably 0.2 to 2 parts by weight with respect to 100 parts by weight of the norbornene ring-opening polymer. The above range of the hydrogenation conditions is preferable because of excellently-balanced hydrogenation degree and heat resistance of the polymer.

The content of the repeating unit (A) derived from 2-norbornene relative to all repeating units of the hydrogenated crystalline norbornene ring-opening polymer is normally 90 wt % or more, preferably 95 wt % or more, and more preferably 97 wt % or more, and the content of the repeating unit (B) derived from the norbornene monomer having a substituent which does not include an aliphatic carbon-carbon double bond relative to all repeating units is 10 wt % or less, preferably 5 wt % or less, and more preferably 3 wt % or less. If the content of the repeating units (A) and (B) is within this range, the resulting molded article exhibits excellent mechanical characteristics, heat resistance, and water vapor barrier properties.

The hydrogenated crystalline norbornene ring-opening polymer according to the present invention has a branched structure. The branching index of the polymer is 0.3 to 0.98, and preferably 0.4 to 0.95. Too large a branching index is not desirable because of a low melt tension which impairs film moldability of the hydrogenated crystalline norbornene ring-opening polymer, although moisture barrier property is increased. Too low a branching index is undesirable because of reduced moisture barrier property and heat resistance.

The branching index is defined by "g=[η]Bra/[η]Lin".

In this formula, [η]Bra indicates the intrinsic viscosity of a branched hydrogenated crystalline norbornene ring-opening polymer, and [η]Lin indicates the intrinsic viscosity of a linear hydrogenated crystalline norbornene ring-opening polymer having the same weight average molecular weight. The intrinsic viscosity [η] is a value obtained by measuring a sample dissolved in cyclohexane at 60° C.

A branching index in the above-mentioned range is preferable because the hydrogenated crystalline norbornene ring-opening polymer has a high melt tension, even if the molecular weight is the same. If the branching index is too large, the polymer may have a reduced melt tension, even if the molecular weight is the same.

A reduced melt tension induces a phenomenon called "neck-in" when molding a film using a T-die, for example. Neck-in is a phenomenon wherein the extruded film has a width significantly smaller than the effective die width. A neck-in film has a large thickness at both ends which must be trimmed (removed) from a molded article. The smaller the degree of neck-in, the wider the film produced and the higher the productivity. A large degree of neck-in means a small melt tension of the hydrogenated crystalline norbornene ring-opening polymer which may result in impaired film-forming processability, leading to a poor film surface precision.

The weight average molecular weight (Mw) of the hydrogenated crystalline norbornene ring-opening polymer measured by a right-angle laser scattering photometry with gel permeation chromatography (GPC) using cyclohexane as an eluant is preferably 50,000 to 200,000, more preferably 70,000 to 180,000, and still more preferably 80,000 to 150,000.

If the Mw is in this range, the hydrogenated crystalline norbornene ring-opening polymer has good solubility in solvents and can be produced with excellent productivity, purified with ease, and molded with ease. The molded article has good mechanical characteristics and heat resistance. Specifically, if the Mw is too high, the viscosity of the solution increases and filterability is reduced, resulting in reduced productivity. In addition, a high temperature is required for the resin in order to increase the film thickness precision when producing a film. This may result in a die line due to burning (coloring) of the resin. If the Mw is too low, mechanical characteristics and heat resistance of the molded article may decrease. In addition, because the hydrogenated ring-opening polymer is crystalline, the hydrogenated polymer dissolves in solvents only with difficulty, resulting in poor productivity of the polymer and difficulty in polymer purification.

The molecular weight distribution (Mw/Mn) of the hydrogenated crystalline norbornene ring-opening polymer is preferably 1.5 to 10.0, more preferably 2.0 to 9.0, still more preferably 3.0 to 8.0, and particularly preferably 4.0 to 7.0.

If the Mw/Mn is too narrow, the melt viscosity of the polymer delicately changes according to a change of temperature, resulting in impaired processability of the molded article such as a film and a sheet. On the other hand, if the Mw/Mn is too broad, the molded article may have poor mechanical characteristics.

The melting point of the hydrogenated crystalline norbornene ring-opening polymer is normally 110 to 145° C, preferably 120 to 145° C, and more preferably 130 to 145° C. If the melting point is in the above range, the molded article has good heat resistance. A melting point in the range of 130 to 145° C is preferable due to capability of the resin to withstand steam sterilization when producing molded articles for medical or food use. The melting point of the hydrogenated crystalline norbornene ring-opening polymer varies according to the molecular weight, molecular weight distribution, isomerization degree, and the like.

The hydrogenated crystalline norbornene ring-opening polymer has a melt flow rate of 15 g/10 min or less, and preferably 10 g/10 min or less at a load of 21.18 N at 230° C. The melt flow rate at a load of 21.18 N at 280° C is normally 100 g/10 min or less, and preferably 70 g/10 min or less. If the melt flow rate is in this range, the polymer has high molding stability and can produce a film with a good thickness precision.

It is preferable for the hydrogenated crystalline norbornene ring-opening polymer according to the present invention to contain only a small amount of foreign matter. Metal residues and foreign matter in a molded plastic article such as a film may induce a decrease in electrical properties when applied to electronic parts. Metal residues and foreign matter can be removed by microfiltration of a solution of the polymer after completion of polymerisation or hydrogenation using a filter with a pore diameter of 0.2 μm or less.

Since the hydrogenated crystalline norbornene ring-opening polymer according to the present invention is a polymer having a melting point, that is a polymer forming a crystal structure, the polymer forms crystalline areas in the molded article. The crystalline areas improve the mechanical characteristics such as tensile elongation at break and the like in combination with amorphous areas.

After the hydrogenation reaction, additives such as an antioxidant (stabilizer), a nucleating agent, a foaming agent, a flame retardant, and other polymers such as a thermoplastic resin and a soft polymer, as well as other additives commonly used in the resin industry field such as a dye, an antistatic agent, a UV absorber, a light stabilizer, a wax, and the like may be added to obtain a resin composition.

As a method of adding the additives, a method of adding the additives to a hydrogenation reaction solution, a method of melting and mixing the hydrogenated ring-opening polymer with the additives using a kneader such as a mono-axial extruder, a biaxial extruder, a roller, a Banbury mixer, and the like may be given.

For ease of handling during a molding operation, the hydrogenated crystalline norbornene ring-opening polymer according to the present invention is processed into grains with the size of rice called pellets, which are used for preparing the later described molded article according to the present invention.

The pellets are used for preparing an injection molded product such as an optical disk and a lens, a tubular or rod-like melt-extrusion product, a sheet and film wounded around a melt-extrusion roll, a sheet prepared by hot pressing the pellets, a film obtained by casting a solution of pellets using an appropriate solvent, a stretched film and sheet, and the like.

2) Molded Article

The molded article according to the present invention is obtained by molding the hydrogenated crystalline norbornene ring-opening polymer according to the present invention.

The molded article can be obtained by processing the polymer into grains with the size of rice (pellets), and molding the pellets.

The shape of the molded article according to the present invention may be appropriately determined without any specific limitation according to the object of use.

The method of molding is not particularly limited. A known molding method may be used. Specific examples include injection molding, injection compression molding, press molding, extrusion molding, blow molding, vacuum molding, and the like.

The molded article according to the present invention is preferably a film.

There are no specific limitations to the method of molding a film. Either a heat-melting molding method or a solution cast method may be used.

The heat-melting molding method is a method of fluidizing pellets by heating at a temperature above the melting point (Tm), but lower than the thermal cracking temperature of the polymer, and molding the fluidized material into a film. The heat-melt molding method includes an extrusion molding method, a calender molding method, a compression molding method, an inflation molding method, an injection molding method, a blow molding method, an extension molding method, and the like. It is possible to apply the extension molding method to a film which has been produced by the extrusion molding method, calender molding method, inflation molding method, or the like.

The heating and pressure conditions in the heat-melting molding method ma be appropriately selected according to the type of molding machine and properties of the hydrogenated crystalline norbornene ring-opening polymer. A temperature in the range normally from Tm to (Tm+100° C), and preferably from (Tm+20° C) to (Tm+50° C) is applied under a pressure of normally from 0.5 to 100 MPa, and preferably from 1 to 50 MPa.

The reaction time is normally from about several seconds to several tens of minutes.

On the other hand, a solution cast method is a method of dissolving the hydrogenated crystalline norbornene ring-opening polymer and optional additives in an organic solvent, casting the solution on a plane or a roll, and removing the solvent by heating to obtain a film and a sheet.

Examples of the solvent used for the solution cast method include the same organic solvents as those used for the previously-mentioned ring-opening polymerization of norbornene monomers and hydrogenation of ring-opening polymers such as aliphatic hydrocarbons, alicyclic hydrocarbons, aromatic hydrocarbons, halogenated aromatic hydrocarbons, nitrogen-containing hydrocarbons, and ethers.

The solution cast method is carried out at a temperature at which the solvent volatilizes. The molding temperature is thus appropriately determined according to the type of solvent used.

The molded article may be annealed in order to increase crystallinity.

There are no specific limitations to the thickness of the film. The thickness is normally 1 μm to 20 mm, preferably 5 μm to 5 mm, and more preferably 10 μm to 2 mm. A film is not distinguished from a sheet by any specific definition, although these terms are sometimes distinguished according to the thickness. The names (film or sheet) vary according to the application and the practice in the industry.

In order to increase the mechanical strength and water vapor barrier properties, the film may be stretched to increase the crystallinity. This is an operation of applying plastic deformation to a film by stretching the length of the molded film about 1.1 to 10 times. The plastic deformation has an effect of orienting amorphous chains, not to mention crystalline chains, by internal friction caused by stretching.

The film may be a laminate of a layer containing the hydrogenated crystalline norbornene ring-opening polymer and a layer containing other polymers.

As the other polymers, rubber-like polymers and other resins may be given. The same polymers and resins previously mentioned as those used together with the hydrogenated crystalline norbornene ring-opening polymer may be given as specific examples of such other polymers.

The number of layers to be laminated is normally two or three, but the film or sheet may be a multilayer laminate consisting of more than three layers. The order of the types of polymers in layers of the three or more multilayer laminate may be appropriately determined according to the purpose and application.

In addition, it is possible to dispose layers of the same polymer separated by a layer of another polymer. For example, it is possible to form a three layer laminate having a layer containing polystyrene sandwiched between two layers containing the hydrogenated crystalline norbornene ring-opening polymer, or to form a four layer laminate having a layer containing a hydrogenated styrene-isoprene block copolymer disposed on either side of the three layer laminate.

As the laminating method, a method of pasting two layers by applying an adhesive between them, a method of bonding a monolayer or a multilayer film or sheet at a temperature above the melting point by heat or high frequency, a method of preparing a dispersion or solution of the hydrogenated crystalline norbornene ring-opening polymer or the other polymers in an organic solvent, applying the dispersion or solution to the surface of the film or sheet of the other polymers or the hydrogenated crystalline norbornene ring-opening polymer, and drying the dispersion of the solution, or the like may be used.

A laminate may also be produced by co-extruding the hydrogenated crystalline norbornene ring-opening polymer and the other polymers from an extruder.

The film obtained from the hydrogenated crystalline norbornene ring-opening polymer according to the present invention has excellent water vapor barrier properties, heat resistance, transparency, oil resistance, and mechanical characteristics such as tensile elongation at break. The film has an advantage of a wide processing temperature range due to the high thermal decomposition temperature.

In addition, the film has excellent water vapor barrier properties. The resin film or sheet of the present invention with a thickness of 100 μm has a moisture permeability measured based on JIS K7129 (Method A) of normally 0.5 g/(m$^2$·24 h) or less, and preferably 0.4 g/(m$^2$·24 h) or less.

The film having these characteristics can be used for a wide variety of applications in the fields of food industries, medical supplies, displays, energy, optical appliances, electrical and electronic parts, the telecommunications sector, vehicles, public welfare, civil engineering and construction, and the like.

The fields in which the film of the present invention are particularly useful include the fields of food industries, medical supplies, energy, displays, and the like.

Applications in the food fields include food packaging, such as a wrap film, a shrink film, and a film for blister packages of processed foods (ham, sausage, pouch-packed food, frozen food and the like), dry food, specified health food, rice, confectionery, meat, and the like.

In the medical field, the film of the present invention may be used as a medical bottle plug, an infusion bag, an intravenous drip bag, a film for a press through package (PTP), a film for blister packages, and the like.

In the energy fields, the film of the present invention may be used as an auxiliary component material of a solar energy power generation system, a fuel-cell peripheral component, an alcohol-containing fuel system component, and a packing film of these components.

In the display field, the film of the present invention may be used as a barrier film, a phase difference film, a polarization film, an optical diffusion sheet, a condensing sheet, and the like.

EXAMPLES

The present invention is further described below by way of examples and comparative examples. Note that the present invention is not limited to the following examples. In the examples and comparative examples, "part(s)" refers to "part(s) by weight", and "%" refers to "wt %" unless otherwise indicated.

In the following examples and comparative examples, the properties were measured by the following methods.

(1) The weight average molecular weight (Mw) and the number average molecular weight (Mn) of the ring-opening polymers were measured as standard polystyrene-reduced values by gel permeation chromatography (GPC) using toluene as an eluant.

As the measuring instrument, GPC-8020 series instruments (DP8020, SD8022, AS8020, CO8020, and RI8020 manufactured by Tosoh Corp.) were used.

As the standard polystyrene, standard polystyrenes (Mw=500, 2630, 10,200, 37,900, 96,400, 427,000, 1,090,000, 5,480,000, manufactured by, Tosoh Corp.) were used.

The sample was prepared by dissolving the polymer to be analyzed in toluene to a concentration of 1 mg/ml and filtering through a cartridge filter (made of polytetrafluoroethylene, pore size: 0.5 μm).

The molecular weight was measured by feeding a sample to two TSKgel GMHHR-H columns (manufactured by Tosoh Corp.) connected in series at a flow rate of 1.0 ml/min in an amount of 100 μl at a column temperature of 40° C.

(2) The absolute weight average molecular weight (Mw) and the absolute number average molecular weight (Mn) of the hydrogenated crystalline norbornene ring-opening polymers were measured by right-angle laser scattering photometry with gel permeation chromatography (GPC) using cyclohexane as an eluant.

The sample was prepared by dissolving the polymer to be analyzed in cyclohexne with heating at 60° C to a concentration of 1 mg/ml.

Model 350 HTGPC (manufactured by Viscotek) was used as a measuring instrument.

The molecular weight was measured by feeding a sample to three columns, i.e., TSKgel G2000HHR, TSKgel G4000HHR, and TSKgel G4000HHR (manufactured by Tosoh Corp.) connected in series at a flow rate of 1.0 ml/min in an amount of 100 μl at a column temperature of 60° C.

(3) The hydrogenation degree of the hydrogenated crystalline norbornene ring-opening polymer was determined by $^1$H-NMR spectrum measurement using deuterochloroform as a solvent.

(4) The isomerization degree was calculated by "33.0 ppm peak integration value/(31.8 ppm peak integration value+ 33.0 ppm peak integration value)×100" (the peak integration values were determined by $^{13}$C-NMR using deuterochloroform as a solvent).

The 31.8 ppm peak is a peak attributed to cis-isomers of 2-norbornene repeating units in the polymer and the 33.0 ppm peak is a peak attributed to trans-isomers of 2-norbornene repeating units in the polymer.

(5) The melting point (Tm) was measured in accordance with JIS K7121 using a differential scanning calorimeter (DSC6220 manufactured by SII NanoTechnology Inc.) after heating the sample to a temperature 30° C higher than the melting point, cooling the sample to room temperature at a cooling rate of −10° C/min, and heating at a rate of 10° C/min.

(6) The melt flow rate was measured in accordance with JIS K7210 at 230° C and a load of 21.18 N, and at 280° C and a load of 21.18 N.

(7) Branching index was calculated by dividing the intrinsic viscosity of a branched hydrogenated crystalline norbornene ring-opening polymer ([η]Bra) by the intrinsic viscosity of a linear hydrogenated crystalline norbornene ring-opening polymer ([η]Lin) having the same weight average molecular weight.

The intrinsic viscosity [η] is obtained by measuring the viscosities of a sample dissolved in cyclohexane to four different concentrations at 60° C using a Udelode viscometer according to a multi-point method. The relationship of each measuring point was extrapolated to the concentration zero.

The intrinsic viscosity of a linear hydrogenated crystalline norbornene ring-opening polymer with the same weight average molecular weight was determined by approximating the intrinsic viscosity of the linear hydrogenated crystalline norbornene ring-opening polymer with four or more points of different absolute weight average molecular weight by [η]Lin=KMw$^a$ (wherein [η]Lin indicates the intrinsic viscosity, Mw indicates the absolute molecular weight, and K and a are constants) and interpolating the resulting value.

A linear hydrogenated norbornene ring-opening polymer can be obtained by copolymerizing monomers used for producing a branched hydrogenated norbornene ring-opening polymer in the absence of a branching agent (compound having a substituent reactive in an olefin metathesis reaction) and hydrogenating the resulting polymer. Linear hydrogenated norbornene ring-opening polymers with different weight average molecular weight were obtained by changing the amount of a molecular weight-adjusting agent.

(8) Neck-in was evaluated by subtracting the die width from the width of the molded film.

A monolayer film (C1) (thickness: 100 μm) was obtained by molding polymer pellets by T-die molding using a hanger manifold T-die film melt extruding press machine (stationary type manufactured by GSI Creos Corp.) equipped with a screw having a screw diameter of 20 mm, a compression ratio of 2.5 or 3.1, and L/D=30 under the following conditions.

<Molding Conditions>
Die lip: 0.8 mm
Molten resin temperature: Tm+40° C (resin without a melting point: Tg+100° C)
Width of T-die: 300 mm
T-die temperature: Tm of resin+50° C (resin without a melting point: Tg+110° C)
Cooling roll: Tm of resin−20° C (resin without a melting point: Tg−15° C)
Casting roll: Tm of resin−10° C (resin without a melting point: Tg−5° C)
Sheet take-up rate: 2.5 m/min
Distance between T-die and cooling roll: 100 mm
Screw compression ratio: a screw with a compression ratio of 2.5 was used for resins having no melting point, and a screw with a compression ratio of 3.1 was used for other resins.

(9) The moisture permeability was measured in accordance with JIS K7129 (method A) using a water vapor permeability tester (L80-5000 type, manufactured by LYSSY) under conditions of a temperature of 40° C and humidity of 90% RH.

Example 1

Ring-Opening Polymerization

A reactor was charged with 700 parts by weight of dehydrated cyclohexane, 0.89 parts by weight of 1-hexene, 1.06 parts by weight of diisopropyl ether, 0.34 parts by weight of triisobutylaluminum, and 0.13 parts by weight of isobutyl alcohol at room temperature under a nitrogen atmosphere. 250 parts by weight of 2-norbornene (2-NB), 1.25 parts by weight of 5-vinyl-2-norbornene (VNB), and 26 parts by weight of a 1.0 wt % solution of tungsten hexachloride in toluene were continuously added over two hours while maintaining the temperature at 55° C to polymerize the monomers. The polymerization conversion was about 100%.

The weight average molecular weight (Mw) of the resulting ring-opening polymer (A) was 61,000, and the molecular weight distribution (Mw/Mn) was 4.1.

(Hydrogenation Reaction)

The polymerization reaction solution obtained above was transferred to a pressure-resistant hydrogenation reactor. After the addition of 1.0 part by weight of a nickel catalyst supported on diatomaceous earth (T8400, nickel support rate: 58 wt %, manufactured by Süd-Chemie), the hydrogenation reaction was carried out at 200° C under a hydrogen pressure of 4.5 MPa for 6 hours. The solution was filtered through a stainless steel wire mesh filter, in which diatomaceous earth was used as a filter aid, to remove the catalyst.

The reaction solution was poured into 3000 parts by weight of isopropyl alcohol with stirring to precipitate the hydrogenated product, which was collected by filtration. After washing with 500 parts by weight of acetone, the hydrogenated product was dried in a vacuum dryer at 100° C under $0.13 \times 10^3$ Pa for 48 hours to obtain 190 parts by weight of a hydrogenated ring-opening polymer (A).

(Properties of Polymer)

The hydrogenation degree of the resulting hydrogenated ring-opening polymer (A) was 99.9%, the weight average molecular weight (Mw) was 70,200, the molecular weight distribution (Mw/Mn) was 3.8, the isomerization degree was 7%, the melting point was 136° C, and the branching index was 0.64.

(Preparation of Resin Composition)

0.1 parts by weight of tetrakis[methylene-3-(3',5'-di-tert-butyl-4'-hydroxyphenyl)-propionate]methane (Irganox 1010 manufactured by Ciba Specialty Co.), hereinafter referred to as "Antioxidant A") was added to 100 parts by weight of the resulting hydrogenated ring-opening polymer (A), and the mixture was kneaded using a twin-screw kneader (TEM35 manufactured by Toshiba Machine Co., Ltd.) to obtain a pelletized resin composition (A).

(Film-Forming)

A film (A) (thickness: 100 μm) was obtained by molding a polymer pellets (hydrogenated 2-norbornene ring-opening polymer) by T-die molding using a hanger manifold T-die film melt extruding press machine (stationary type, manufactured by GSI Creos Corp.) equipped with a screw having a screw diameter of 20 mm, a compression ratio of 2.5 or 3.1, and L/D=30 under the following conditions.

<Molding Conditions>

Die lip: 0.8 mm
Molten resin temperature: 176° C
Width of T-die: 300 mm
Die temperature: 186° C
Cooling roller: 116° C
Casting roll: 130° C
Sheet take-up rate: 2.5 m/min
Distance between T-die and cooling roll: 100 mm
Screw compression ratio: 3.1

Example 2

Ring-Opening Polymerization

A ring-opening copolymer (B) was obtained in the same manner as in Example 1 except that 17.5 parts by weight of NB-dimer was used instead of VNB. The polymerization conversion was about 100%.

The weight average molecular weight (Mw) of the resulting ring-opening copolymer (B) was 60,000, and the molecular weight distribution (Mw/Mn) was 4.0.

(Hydrogenation Reaction)

A hydrogenated ring-opening copolymer (B) was obtained in the same manner as in Example 1 by hydrogenating the resulting ring-opening copolymer (B).

(Properties of Polymer)

The hydrogenation degree of the hydrogenated ring-opening polymer (B) was 99.9%, the weight average molecular weight (Mw) was 69,000, the molecular weight distribution (Mw/Mn) was 3.7, the isomerization degree was 5%, the melting point was 134° C, and the branching index was 0.43.

(Preparation of Resin Composition)

A resin composition (B) was obtained in the same manner as in Example 1 from the resulting hydrogenated ring-opening polymer (B).

(Film Formation)

A film (B) (thickness: 100 μm) was obtained in the same manner as in Example 1, except that the molten resin temperature was 174° C, the T-die temperature was 184° C, the cooling roll temperature was 114° C, and the casting roll temperature was 124° C.

Example 3

Ring-Opening Polymerization

A ring-opening copolymer (C) was obtained in the same manner as in Example 1 except that 0.60 parts by weight of 1,2,4-trivinyl cyclohexane was used instead of VNB. The polymerization conversion was about 100%.

The weight average molecular weight (Mw) of the resulting ring-opening copolymer (C) was 61,000, and the molecular weight distribution (Mw/Mn) was 4.1.

(Hydrogenation Reaction)

A hydrogenated ring-opening copolymer (C) was obtained in the same manner as in Example 1 by hydrogenating the resulting ring-opening copolymer (C).

(Properties of Polymer)

The hydrogenation degree of the hydrogenated ring-opening polymer (C) was 99.9%, the weight average molecular weight (Mw) was 71,200, the molecular weight distribution (Mw/Mn) was 3.7, the isomerization degree was 7%, the melting point was 135° C, and the branching index was 0.93.

(Preparation of Resin Composition)

A resin composition (C) was obtained in the same manner as in Example 1 from the resulting hydrogenated ring-opening polymer (C).

(Film Formation)

A film (C) (thickness: 100 μm) was obtained in the same manner as in Example 1, except that the molten resin temperature was 175° C, the T-die temperature was 185° C, the cooling roll temperature was 115° C, and the casting roll temperature was 125° C.

Example 4

Ring-Opening Polymerization

A ring-opening copolymer (D) was obtained in the same manner as in Example 1, except that 240 parts by weight of 2-norbornene and 10 parts by weight of dicyclopentadiene (DCP) were used as monomers, and the amount of VNB was 0.75 parts by weight and the amount of 1-hexene was 0.79 parts by weight. The polymerization conversion was about 100%.

The weight average molecular weight (Mw) of the resulting ring-opening copolymer (D) was 64,800, and the molecular weight distribution (Mw/Mn) was 4.5.
(Hydrogenation Reaction)
A hydrogenated ring-opening polymer (D) was obtained in the same manner as in Example 1 by hydrogenating the resulting ring-opening copolymer (D).
(Properties of Polymer)
The hydrogenation degree of the resulting hydrogenated ring-opening polymer (D) was 99.9%, the weight average molecular weight (Mw) was 74,600, the molecular weight distribution (Mw/Mn) was 4.2, the isomerization degree was 6%, the melting point was 139° C, and the branching index was 0.85.
(Preparation of Resin Composition)
A resin composition (D) was obtained in the same manner as in Example 1 from the resulting hydrogenated ring-opening polymer (D).
(Film Formation)
A film (D) (thickness: 100 μm) was obtained in the same manner as in Example 1, except that the molten resin temperature was 179° C, the T-die temperature was 189° C, the cooling roll temperature was 119° C, and the casting roll temperature was 129° C.

Comparative Example 1

Ring-Opening Polymerization

A ring-opening copolymer (E) was obtained in the same manner as in Example 1 except that the addition of VNB was omitted. The polymerization conversion was about 100%.
The weight average molecular weight (Mw) of the resulting ring-opening copolymer (E) was 61,000, and the molecular weight distribution (Mw/Mn) was 4.8.
(Hydrogenation Reaction)
A hydrogenated ring-opening polymer (E) was obtained in the same manner as in Example 1 by hydrogenating the resulting ring-opening copolymer (E).
(Properties of Polymer)
The hydrogenation degree of the resulting hydrogenated ring-opening polymer (E) was 99.9%, the weight average molecular weight (Mw) was 70,500, the molecular weight distribution (Mw/Mn) was 3.5, the isomerization degree 5%, the melting point was 140° C, and the branching index was 1.01.
(Preparation of Resin Composition)
A resin composition (E) was obtained in the same manner as in Example 1 from the resulting hydrogenated ring-opening polymer (E).
(Film Formation)
A film (E) (thickness: 100 μm) was obtained in the same manner as in Example 1, except that the molten resin temperature was 180° C, the T-die temperature was 190° C, the cooling roll temperature was 120° C, and the casting roll temperature was 130° C.

Comparative Example 2

Ring-Opening Polymerization

A ring-opening copolymer (F) was obtained in the same manner as in Example 1 except that the amount of VNB was 37.5 parts by weight. The polymerization conversion was about 100%.

The weight average molecular weight (Mw) of the resulting ring-opening copolymer (F) was 62,000, and the molecular weight distribution (Mw/Mn) was 4.3.
(Hydrogenation Reaction)
A hydrogenated ring-opening polymer (F) was obtained in the same manner as in Example 1 by hydrogenating the resulting ring-opening copolymer (F).
(Properties of Polymer)
The hydrogenation degree of the hydrogenated ring-opening polymer (F) was 99.9%, the weight average molecular weight (Mw) was 71,000, the molecular weight distribution (Mw/Mn) was 4.0, the isomerization degree was 7%, the melting point was 110° C., and the branching index was 0.13.
(Preparation of Resin Composition)
A resin composition (F) was obtained in the same manner as in Example 1 from the resulting hydrogenated ring-opening polymer (F).
(Film Formation)
A film (F) (thickness: 100 μm) was obtained in the same manner as in Example 1, except that the molten resin temperature was 150° C, the T-die temperature was 160° C. the cooling roll temperature was 90° C, and the casting roll temperature was 100° C.

Comparative Example 3

Ring-Opening Polymerization

A ring-opening copolymer (G) was obtained in the same manner as in Comparative Example 1 except that the amount of 1-hexene used was 0.05 parts by weight. The polymerization conversion was about 100%.
The weight average molecular weight (Mw) of the resulting ring-opening polymer (G) was 161,000, and the molecular weight distribution (Mw/Mn) was 6.8.
(Hydrogenation Reaction)
A hydrogenated ring-opening polymer (G) was obtained in the same manner as in Example 2 by hydrogenating the resulting ring-opening copolymer (G).
(Properties of Polymer)
The hydrogenation degree of the hydrogenated ring-opening polymer (G) was 96.3%, the weight average molecular weight (Mw) was 185,300, the molecular weight distribution (Mw/Mn) was 5.3, the isomerization degree was 9%, the melting point was 132° C, and the branching index was 0.99.
(Preparation of Resin Composition)
A resin composition (G) was obtained in the same manner as in Example 2 from the resulting hydrogenated ring-opening polymer (G).
(Film Formation)
A film (G) (thickness: 100 μm) was obtained in the same manner as in Example 1, except that the molten resin temperature was 172° C, the T-die temperature was 182° C, the cooling roll temperature was 112° C, and the casting roll temperature was 122° C.

Comparative Example 4

Ring-Opening Polymerization

An autoclave equipped with a stirrer was charged with 37.5 parts by weight of a 70% norbornene/toluene solution, 0.052 parts by weight of 1-hexene, and 49.3 parts by weight of cyclohexane in a nitrogen atmosphere, and the mixture was stirred. Then, a solution containing 0.023 parts by weight of 2,6-diisopropylphenylimido neophylidene molybdenum (VI) bis(tert-butoxide) and 0.016 parts by weight of trimethylphosphine in 8.6 parts by weight of toluene was added, and the reaction was carried out at 30° C for one hour, followed by the addition of 0.40 parts by weight of benzaldehyde to obtain a reaction solution containing a ring-opening polymer (H). The polymerization conversion was about 100%.

The weight average molecular weight (Mw) of the resulting ring-opening polymer (H) was 65,000, and the molecular weight distribution (Mw/Mn) was 1.1.

(Hydrogenation Reaction)

The reaction solution containing the ring-opening polymer (H) obtained above was transferred to a pressure-resistant hydrogenation reactor. After the addition of 5.25 parts by weight of Pd/CaCO$_3$ (amount of Pd: 5 wt %, manufactured by Strem Chemicals, Inc.) as a catalyst, the hydrogenation reaction was carried out at 100° C under a hydrogen pressure of 3.5 MPa for 48 hours. The solution was filtered through a stainless steel wire mesh filter, in which diatomaceous earth was used as a filter aid, to remove the catalyst. The reaction solution was poured into 3000 parts by weight of isopropyl alcohol with stirring to precipitate the hydrogenated product, which was collected by filtration. After washing with 500 parts by weight of acetone, the hydrogenated product was dried in a vacuum dryer at 100° C under 0.13×10$^3$ Pa for 48 hours to obtain 190 parts by weight of a hydrogenated ring-opening polymer (H).

(Properties of Polymer)

The hydrogenation degree of the resulting hydrogenated ring-opening polymer (H) was 99.75%, the weight average molecular weight (Mw) was 64,200, the molecular weight distribution (Mw/Mn) was 1.3, the isomerization degree was 0%, the melting point was 143° C, and the branching index was 0.99

(Preparation of Resin Composition)

A resin composition (H) was obtained in the same manner as in Example 1 from the resulting hydrogenated ring-opening polymer (H).

(Film Formation)

A film (H) (thickness: 100 μm) was obtained in the same manner as in Example 1, except that the molten resin temperature was 183° C, the T-die temperature was 193° C, the cooling roll temperature was 123° C, and the casting roll temperature was 133° C.

Comparative Example 5

Ring-Opening Polymerization

A ring-opening polymer (I) was obtained in the same manner as in Example 3 except that the addition of VNB was omitted. The polymerization conversion was about 100%.

The weight average molecular weight (Mw) of the resulting ring-opening copolymer (I) was 62,800, and the molecular weight distribution (Mw/Mn) was 4.1.

(Hydrogenation Reaction)

A hydrogenated ring-opening polymer (I) was obtained in the same manner as in Example 1 by hydrogenating the resulting ring-opening copolymer (I).

(Properties of Polymer)

The hydrogenation degree of the resulting hydrogenated ring-opening polymer (I) was 99.9%, the weight average molecular weight (Mw) was 72,300, the molecular weight distribution (Mw/Mn) was 3.8, the isomerization degree was 4%, the melting point was 134° C, and the branching index was 1.0.

(Preparation of Resin Composition)

A resin composition (I) was obtained in the same manner as in Example 1 from the resulting hydrogenated ring-opening polymer (I).

(Film Formation)

A film (I) (thickness: 100 μm) was obtained in the same manner as in Example 1, except that the molten resin temperature was 174° C, the T-die temperature was 184° C, the cooling roll temperature was 114° C, and the casting roll temperature was 124° C.

Comparative Example 6

Ring-Opening Polymerization

A polymerization reaction was carried out in the same manner as in Example 1 except for using 30 parts by weight of 8-ethyltetracyclo[4.4.0.1$^{2,5}$.1$^{7,10}$]dodec-3-ene (ETD), 170 parts by weight of DCP, 0.18 parts by weight of diisopropyl ether, 0.59 parts by weight of triisobutylaluminum, 0.45 parts by weight of isobutyl alcohol, and 10 parts by weight of a 1.0 wt % tungsten hexachloride solution in toluene. The polymerization conversion was about 100%.

(Hydrogenation Reaction)

A hydrogenated ring-opening polymer (J) was obtained in the same manner as in Example 1 by hydrogenating the resulting ring-opening copolymer (J).

(Properties of Polymer)

The hydrogenation degree of the resulting hydrogenated ring-opening polymer (J) was 99.9%, the weight average molecular weight (Mw) was 31,000, the molecular weight distribution (Mw/Mn) was 3.0, the glass transition temperature was 100° C, and the branching index was 1.0.

(Preparation of Resin Composition)

A resin composition (J) was obtained in the same manner as in Example 1 from the resulting hydrogenated ring-opening polymer (J).

(Film Formation)

A film (J) (thickness: 100 μm) was obtained in the same manner as in Example 1, except that the molten resin temperature was 200° C, the T-die temperature was 210° C, the cooling roll temperature was 85° C, and the casting roll temperature was 95° C.

Properties of the hydrogenated polymers (A) to (J) obtained in Examples and Comparative Examples are shown in Table 1, and the amount of neck-in and moisture permeability of the films (A) to (J) are shown in Table 2. In Table 1, "TVC" stands for 1,2,4-trivinylcyclohexane and "MFR" stands for melt flow rate.

TABLE 1

| | | Resin compo-sition | Norbornene monomer (wt %) | | | Branching agent (mol % per 100 mol % of monomers) | | | Hydrogenated ring-opening polymer | | | | | MFR (230° C.) | MFR (280° C.) |
|---|---|---|---|---|---|---|---|---|---|---|---|---|---|---|---|
| | | | 2-NB | DCP | ETD | VNB | NB-dimer | TVC | Mw | Mw/Mn | mp (° C.) | Isomerization degree (%) | Branching index | | |
| Example | 1 | A | 100 | | | 0.39 | | | 70,200 | 3.8 | 136 | 7 | 0.64 | 3 | 22 |
| | 2 | B | 100 | | | | 3.6 | | 69,000 | 3.7 | 134 | 5 | 0.43 | 4 | 29 |
| | 3 | C | 100 | | | | | 0.14 | 71,200 | 3.7 | 135 | 7 | 0.93 | 8 | 56 |
| | 4 | D | 96 | 4 | | 0.23 | | | 74,600 | 4.2 | 139 | 6 | 0.85 | 6 | 45 |
| Comparative Example | 1 | E | 100 | | | | | | 70,500 | 3.5 | 140 | 5 | 1.01 | 23 | >150 |
| | 2 | F | 100 | | | 11.72 | | | 71,000 | 4.0 | 110 | 7 | 0.13 | 60 | >150 |
| | 3 | G | 100 | | | | | | 185,300 | 5.3 | 132 | 9 | 0.99 | 7 | 49 |
| | 4 | H | 100 | | | | | | 64,200 | 1.3 | 143 | 0 | 0.99 | 34 | >150 |
| | 5 | I | 96 | 4 | | | | | 72,300 | 3.8 | 134 | 4 | 1.0 | 21 | 140 |
| | 6 | J | | 85 | 15 | | | | 31,000 | 3.0 | 100 (Tg) | — | 1.0 | 14 | 90 |

TABLE 2

| | Film | Neck-in (mm) | Moisture permeability (g/(m² · 24 h)) |
|---|---|---|---|
| Example 1 | A | 43 | 0.31 |
| Example 2 | B | 39 | 0.32 |
| Example 3 | C | 55 | 0.31 |
| Example 4 | D | 50 | 0.35 |
| Comparative Example 1 | E | 110 | 0.27 |
| Comparative Example 2 | F | 123 | 0.92 |
| Comparative Example 3 | G | 93 | 0.51 |
| Comparative Example 4 | H | 130 | 0.31 |
| Comparative Example 5 | I | 105 | 0.34 |
| Comparative Example 6 | J | 35 | 0.91 |

It can be seen from Tables 1 and 2 that the films (A) to (D) obtained from the hydrogenated norbornene ring-opening polymers (A) to (D) having a branching index of 0.3 to 0.98 prepared in Examples 1 to 4 have excellent productivity as demonstrated by a small neck-in amount of 60 mm or less, and have excellent moisture resistance as demonstrated by small moisture permeability of 0.35 g/(m²·24 h) or less.

On the other hand, the hydrogenated linear ring-opening polymers (E), (H), and (I) having a branching index of 0.98 or more and the films (E), (H), and (I) made from these polymers of Comparative Examples 1, 4, and 5 had a large MFR and an unduly large neck-in amount, indicating their poor productivity in spite of their excellent water vapor barrier properties.

In an experiment of Comparative Example 2, in which the amount of the branching agent was increased to reduce the branching index to as low as 0.13, the resulting hydrogenated linear rig-opening polymer (F) and the film (F) showed a low melting point indicating poor heat resistance. In addition, the MFR was unduly high, the neck-in amount was large, and damp-proof properties decreased.

In Comparative Example 3 in which the hydrogenated linear ring-opening polymer (G) had a high molecular weight and a small MFR (MFR=7), the resulting film (G) showed a large neck-in amount and poor water vapor barrier properties.

The hydrogenated amorphous norbornene ring-opening polymer (J) of Comparative Example 6 and the film (J) obtained therefrom showed a small neck-in amount, but their water vapor barrier properties were poor.

Based on the above results, the hydrogenated norbornene ring-opening polymers and films of Examples can be concluded to possess excellent water vapor barrier properties and excellent processability as demanded in recent years in the fields of information processing, food industries, medical supplies, civil engineering works, and the like.

The invention claimed is:

1. A hydrogenated crystalline norbornene ring-opening polymer obtained by hydrogenating 80% or more of carbon-carbon double bonds of a ring-opening polymer that is obtained by ring-opening polymerization of norbornene monomers including 90 to 100 wt% of 2-norbornene and 0 to 10 wt% of a 2-norbornene derivative having a substituent which does not include an aliphatic carbon-carbon double bond, the hydrogenated crystalline norbornene ring-opening polymer having a melting point of 110 to 145° C and a branching index of 0.3 to 0.98.

2. The hydrogenated crystalline norbornene ring-opening polymer according to claim 1, the hydrogenated crystalline norbornene ring-opening polymer having a weight average molecular weight measured by gel permeation chromatography of 50,000 to 200,000, and a ratio of the weight average molecular weight to the number average molecular weight of 1.5 to 10.0.

3. The hydrogenated crystalline norbornene ring-opening polymer according to claim 1, wherein the ring-opening polymerization is carried out in the presence of a branching agent.

4. The hydrogenated crystalline norbornene ring-opening polymer according to claim 1, the hydrogenated crystalline norbornene ring-opening polymer having a melt flow rate of 15 g/10 min or less at a temperature of 230° C and a load of 21.18 N.

5. A molded article obtained by molding the hydrogenated crystalline norbornene ring-opening polymer according to claim 1.

6. The hydrogenated crystalline norbornene ring-opening polymer according to claim 2, wherein the ring-opening polymerization is carried out in the presence of a branching agent.

7. The hydrogenated crystalline norbornene ring-opening polymer according to claim 6, the hydrogenated crystalline norbornene ring-opening polymer having a melt flow rate of 15 g/10 min or less at a temperature of 230° C and a load of 21.18 N.

8. A molded article obtained by molding the hydrogenated crystalline norbornene ring-opening polymer according to claim 6.

9. The hydrogenated crystalline norbornene ring-opening polymer according to claim 3, the hydrogenated crystalline norbornene ring-opening polymer having a melt flow rate of 15 g/10 min or less at a temperature of 230° C and a load of 21.18 N.

10. A molded article obtained by molding the hydrogenated crystalline norbornene ring-opening polymer according to claim 9.

* * * * *